(12) United States Patent
     Anno

(10) Patent No.: US 12,118,257 B2
(45) Date of Patent: Oct. 15, 2024

(54) METHOD, SYSTEM AND APPARATUS FOR CLOUD-BASED PRINTING

(71) Applicant: ZEBRA TECHNOLOGIES CORPORATION, Lincolnshire, IL (US)

(72) Inventor: Bret M. Anno, Mundelein, IL (US)

(73) Assignee: Zebra Technologies Corporation, Lincolnshire, IL (US)

(*) Notice: Subject to any disclaimer, the term of this patent is extended or adjusted under 35 U.S.C. 154(b) by 0 days.

(21) Appl. No.: 17/740,507

(22) Filed: May 10, 2022

(65) Prior Publication Data

US 2023/0004333 A1     Jan. 5, 2023

Related U.S. Application Data

(63) Continuation of application No. 16/912,393, filed on Jun. 25, 2020, now Pat. No. 11,327,698.

(51) Int. Cl.
     *G06F 3/12*     (2006.01)
     *H04N 1/00*     (2006.01)

(52) U.S. Cl.
     CPC ........... *G06F 3/126* (2013.01); *G06F 3/1296* (2013.01); *H04N 1/00244* (2013.01)

(58) Field of Classification Search
     CPC ...... G06F 3/126; G06F 3/1296; G06F 3/1204; G06F 3/1207; G06F 3/1259; G06F 3/1288; H04N 1/00244
     USPC ........................................................ 358/1.15
     See application file for complete search history.

(56) References Cited

U.S. PATENT DOCUMENTS

| 8,947,706 | B2* | 2/2015 | Ichida | G06F 3/1222 |
| | | | | 358/1.9 |
| 2010/0220355 | A1* | 9/2010 | Sugiyama | G06F 3/1273 |
| | | | | 358/1.15 |
| 2012/0188583 | A1* | 7/2012 | Stone | G06F 3/1288 |
| | | | | 358/1.14 |
| 2019/0286377 | A1* | 9/2019 | Nishida | G06F 3/1287 |
| 2020/0019352 | A1* | 1/2020 | Agrawal | G06F 3/1204 |

FOREIGN PATENT DOCUMENTS

| CN | 108270591 | * | 6/2021 | ........ H04L 41/0803 |
| JP | 2006148488 | * | 6/2006 | |
| WO | WO2009137762 | * | 11/2009 | ............... G06F 3/12 |

* cited by examiner

*Primary Examiner* — Jerome Grant, II

(57) ABSTRACT

A server includes: a memory storing printing configuration rules for interfacing with a printing system; a communications interface configured to communicate with a client device; a processor interconnected with the memory and the communications interface, the processor configured to: generate a print system network identifier mapped to the printing system, the print system network identifier configured for identifying print parameters for print jobs; receive, via the communications interface, a print request from the client device, the print request generated based on the print system network identifier and including one or more print parameters for a print job; and send a print instruction to the printing system to initiate the print job at the printing system according to the one or more print parameters, the print instruction generated according to the printing configuration rules.

10 Claims, 6 Drawing Sheets

METHOD, SYSTEM AND APPARATUS FOR CLOUD-BASED PRINTING

RELATED APPLICATION

This patent arises from a continuation of U.S. application Ser. No. 16/912,393, filed Jun. 25, 2020, now U.S. Pat. No. 11,327,698, which is hereby incorporated herein by reference.

BACKGROUND

Printing data from a computing device typically involves transmitting the data to a local printer, e.g. connected directly to the computing device or to a local network that includes the computing device. Print resources may be inaccessible to a computing device from outside such local networks, or may be accessible via multiple stages of communications between the computing device and various other devices, e.g. to gain access to the local networks.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
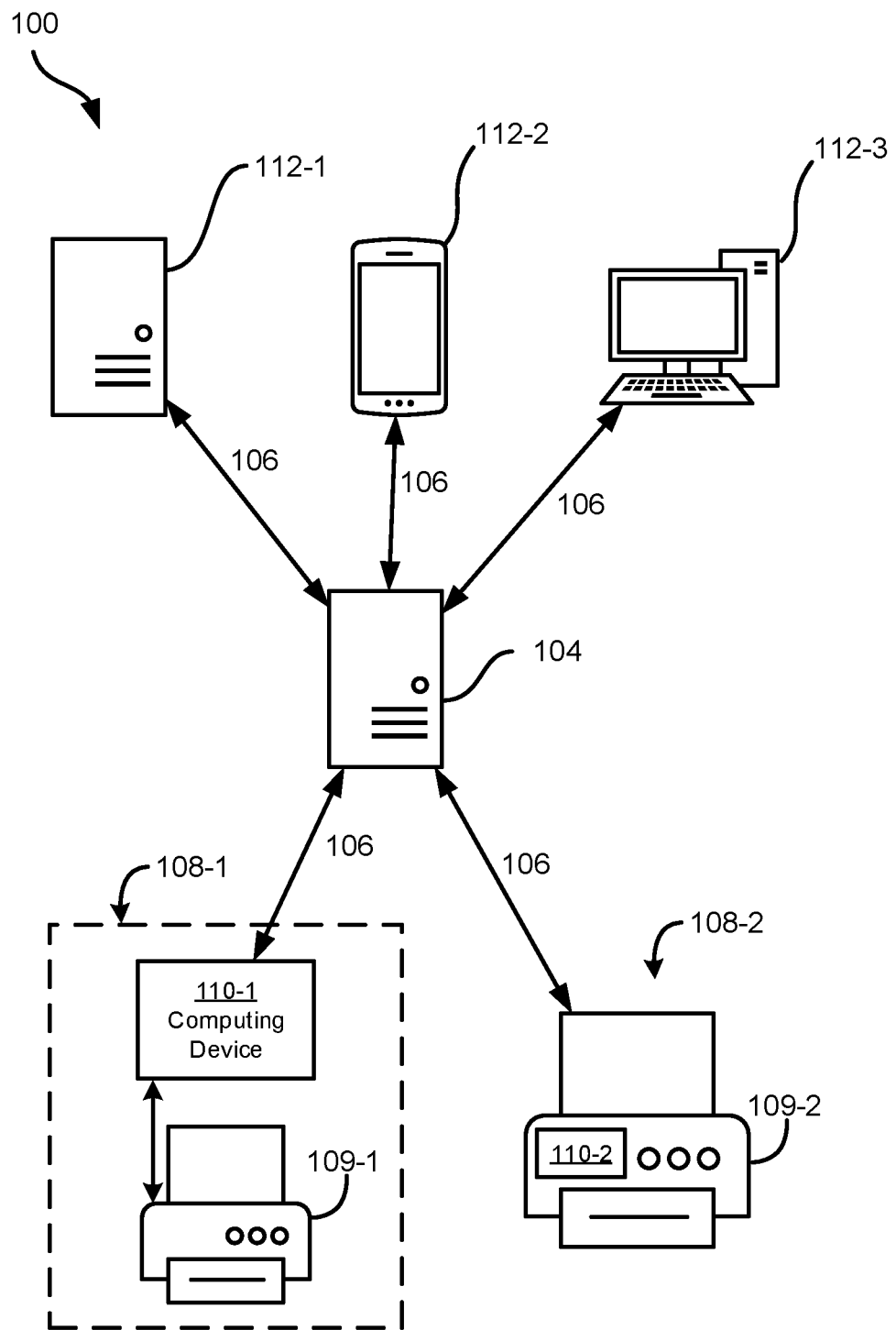
FIG. 1 is a diagram illustrating cloud-based printing system.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a server including a memory storing printing configuration rules for interfacing with a printing system; a communications interface configured to communicate with a client device; a processor interconnected with the memory and the communications interface, the processor configured to: generate a print system network identifier mapped to the printing system, the print system network identifier configured for identifying print parameters for print jobs; receive, via the communications interface, a print request from the client device, the print request generated based on the print system network identifier and including one or more print parameters for a print job; and send a print instruction to the printing system to initiate the print job at the printing system according to the one or more print parameters, the print instruction generated according to the printing configuration rules.

Additional examples disclosed herein are directed to a method comprising: storing printing configuration rules for interfacing with a printing system; generating a print system network identifier mapped to the printing system, the print system network identifier configured for identifying print parameters for print jobs; receiving a print request from the client device, the print request generated based on the print system network identifier and including one or more print parameters for a print job; and sending a print instruction to the printing system to initiate the print job at the printing system according to the one or more print parameters, the print instruction generated according to the printing configuration rules.

Further examples disclosed herein are directed to a non-transitory computer-readable medium storing a plurality of computer-readable instructions executable by a processor, wherein execution of the instructions configures the processor to: generate a print system network identifier mapped to the printing system, the print system network identifier configured for identifying print parameters for print jobs; receive, via the communications interface, a print request from the client device, the print request generated based on the print system network identifier and including one or more print parameters for a print job; and send a print instruction to the printing system to initiate the print job at the printing system according to the one or more print parameters, the print instruction generated according to printing configuration rules stored in a memory.

FIG. 1 depicts an example system 100 for cloud-based printing. The system 100 includes a server 104, printing systems 108-1, 108-2, and client devices 112-1, 112-2, 112-3. The printing systems 108, and the client devices 112 are connected to the server 104 via communication links 106. The system 100 enables cloud- or web-based printing, and hence the communication links 106 may utilize suitable wide area networks (WAN), including cellular networks and the Internet. The communication links 106 may further utilize local area networks defined by one or more routers, switches, wireless access points, or the like.

The server 104 provides a cloud-based printing service so that a connected client device 112 may print to a printing system 108 via the server 104. More specifically, the server 104 is configured to enable cloud printing without requiring account creation or authentication. To enable this, the server 104 maps print system network identifiers (e.g., a uniform resource locator or URL) to each printing system 108. The print system network identifier is configured for identifying print parameters for print jobs. That is, print jobs may be initiated directly using the print system network identifier and may be processed without requiring authentication by the requesting client device 112. Thus, the print system network identifier is also configured to bypass authentication at the server 104.

In operation, the server 104 generates at least one print system network identifier for each printing system 108 registered with the server 104. Each print system network identifier maps to a corresponding printing system 108 and is configured for identifying print parameters for the print job. That is, the print system network identifier allows the print parameters for a print job to be specified at the client devices 112. For example, the print system network identifier may correspond to a web page in which end users may input print parameters, submission of which acts as a print request when received at the server 104. Alternately, the print parameters may be appended as variables to the print system network identifiers to form a print job network identifier, which acts as a print request when received at the server 104. Thus, access to the print system network identifiers enables print requests to be directly generated based on the print system network identifier.

The print system network identifiers may therefore be shared or distributed, including to third parties to reduce the number of back-and-forth communications required between the parties. For example, in a conventional model, an end user may request and download a document from a third party, and then generate a print request to print the document. In the present example, the end user may provide the print system network identifier to the third party. The third party may then generate the print request to print the document using the print system network identifier directly, and without the end user downloading the document. Advantageously, since the print request is generated using the print system network identifier directly, the third party may bypass authentication requirements with the server 104 and proceed to generate the print request.

The printing systems 108 may include any suitable systems configured to communicate with the server 104 via the communication links 106 and to print documents or other data. For example, the printing system 108-1 includes a printer 109-1 and a separate computing device 110-1, such as a laptop computer, a desktop computer, a print server, or the like, which is interconnected with the printer 109-1 to bridge between the printer 109-1 and network communications with the server 104. The printing system 108-2 includes a cloud-enabled printer 109-2 having an integrated printer communications interface 110-2 to allow the printer 109-2 to communicate directly with the server 104.

The client devices 112 may be computing devices, such as desktop computers, laptop computers, mobile devices, kiosks, other servers, tablets, or other suitable computing devices. In particular, the client devices 112 are configured to communicate with the server 104 via the communication links 106 to initiate print jobs at one of the printing systems 108. The client devices 112 include suitable hardware (e.g., including communication interfaces, processors, memories, user interfaces, and the like) to enable the functionality described herein. For example, the client devices 112 may implement a web browser application to access the print system network identifier and to allow the user to input print parameters for a particular print job.

Figure 2:
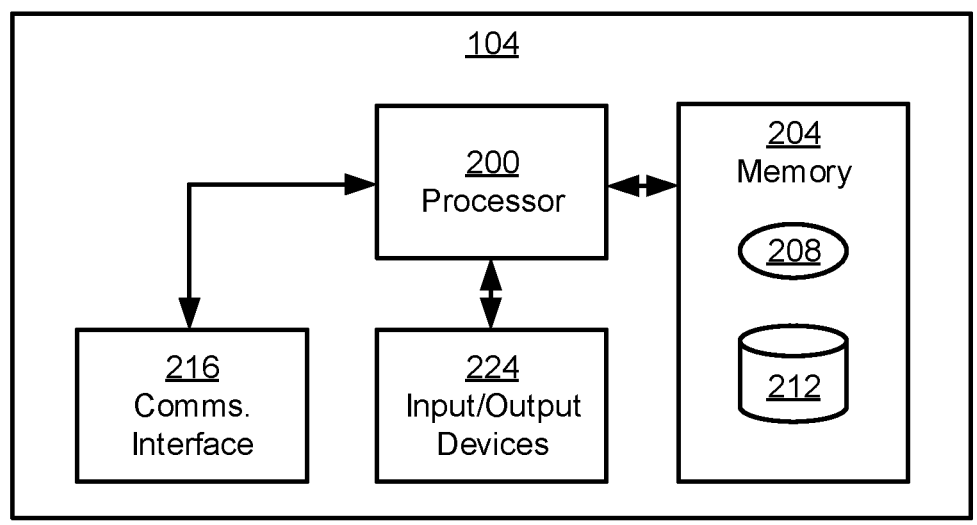
FIG. 2 is a block diagram of certain internal hardware components of the server of FIG. 1.

Referring to FIG. 2, the server 104, including certain internal components, is shown in greater detail. The server 104 includes a processor 200 interconnected with a non-transitory computer-readable storage medium, such as a memory 204. The memory 204 includes a combination of volatile memory (e.g. Random Access Memory or RAM) and non-volatile memory (e.g. read only memory or ROM, Electrically Erasable Programmable Read Only Memory or EEPROM, flash memory). The processor 200 and the memory 204 may each comprise one or more integrated circuits.

The memory 204 stores computer-readable instructions for execution by the processor 200. In particular, the memory 204 stores a control application 208 which, when executed by the processor 200, configures the processor 200 to perform various functions discussed below in greater detail and related to the printing operation of the server 104. The application 208 may also be implemented as a suite of distinct applications. The processor 200, when so configured by the execution of the application 208, may also be referred to as a controller 200.

Those skilled in the art will appreciate that the functionality implemented by the processor 200 may also be implemented by one or more specially designed hardware and firmware components, such as a field-programmable gate array (FPGAs), application-specific integrated circuits (ASICs) and the like in other embodiments. In an embodiment, the processor 200 may be, respectively, a special purpose processor which may be implemented via dedicated logic circuitry of an ASIC, an FPGA, or the like in order to enhance the processing speed of the dimensioning operations discussed herein.

The memory 204 also includes a repository 212 storing rules and data for printing operations. For example, the repository 212 may define, for each printing system 108, a print system network identifier, printing configuration rules, and other data pertaining to the printing system 108 (e.g., a nickname, print job thresholds, or the like). The printing configuration rules may include driver interfaces, communication protocols for sending print parameters and print data, or the like. In particular, each printing system 108 may have different printing configuration rules, and hence the repository 212 may define appropriate printing configuration rules for each printing system 108.

The server 104 also includes a communications interface 216 interconnected with the processor 200. The communications interface 216 includes suitable hardware (e.g. transmitters, receivers, network interface controllers and the like) allowing the server 104 to communicate with other computing devices—such as the printing systems 108 and the client devices 112—via the links 106. The specific components of the communications interface 216 are selected based on the type of network or other links that the server 104 is to communicate over. The server 104 can be configured, for example, to communicate with the client devices 112 to receive print requests, and to send print instructions to the printing systems 108.

The processor 200 may also be connected to one or more input and/or output devices 224. The input devices 224 can include one or more keyboards, mice, touch-sensitive display screens or the like. The output devices 224 can further include one or more display screens, sound generators, or the like for providing output or feedback to an operator.

Figure 3:
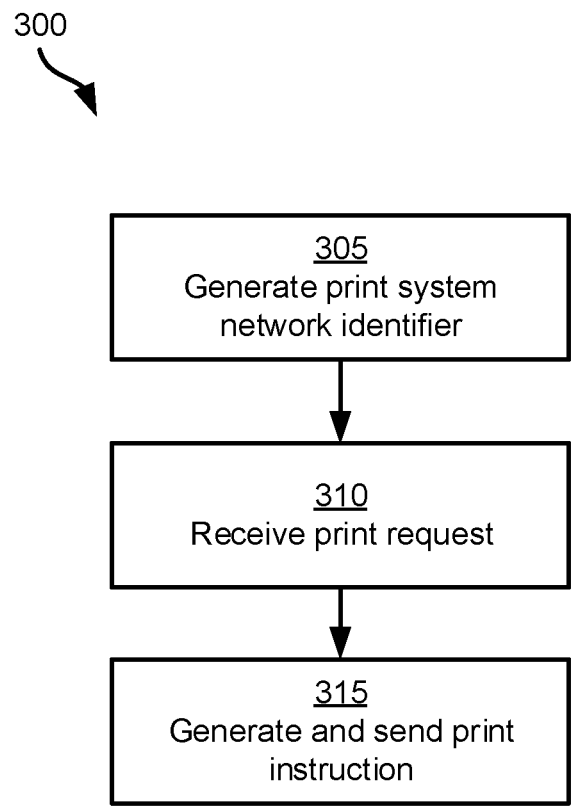
FIG. 3 is a flowchart of a method of cloud-based printing.

The functionality of the server 104, as implemented via execution of the applications 208 by the processor 200 will now be described in greater detail, with reference to FIG. 3. FIG. 3 illustrates a method 300 of cloud-based printing, which will be described in conjunction with its performance in the system 100, and in particular, by the server 104, with reference to the components illustrated in FIGS. 1 and 2. In other examples, the method 300 may be performed in other suitable systems.

At block 305, the server 104 generates a print system network identifier corresponding to each of the printing systems 108 associated with the server 104.

For example, the server 104 may host a cloud-printing service available at the network identifier "print.com". When the printing system 108-1 is registered with the cloud-printing service hosted by the server 104, the server 104 may generate a print system network identifier "print- .com/printer108-1" mapped to the printing system 108-1. Similarly, when the printing system 108-2 is registered with the cloud-printing service hosted by the server 104, the server 104 may generate another print system network identifier "print.com/printer108-2" mapped to the printing system 108-2. In some examples, network identifier may include a token to map to a given printing system (i.e., "printer108-1" or "printer108-2" in the present examples) which is sufficiently long, or has a sufficient number of bytes such that randomly accessing said network identifier is computationally hard. The print system network identifiers may thus serve to identify the appropriate printing system, as will be described further herein. The print system network identifiers are also configured for identifying print parameters for print jobs, as will be described further below. The server 104 may then store associations between the print system network identifiers, the printing systems, and the printing configuration rules for interfacing with the printing systems.

In some examples, at block 305, the server 104 may further provide the print system network identifiers to the client devices 112. For example, the print system network identifiers may be provided at a central web page (e.g., at "print.com/printer-list") for look-up by the client devices 112. Accordingly, when a user operating the client device 112-2 uses a web browser application to access "print.com/printer-list", the server 104 may provide the corresponding web page, listing the printing systems 108 for selection. In some examples, users may be required to authenticate or log in prior to viewing the list of printing systems 108 available for selection. The printing systems 108 may further be associated with a nickname and/or a description to allow the end users to differentiate the printing systems 108-1 and 108-2. For example, the printing system 108-1 may be associated with the description "black and white printer" while the printing system 108-2 may be associated with the description "color printer". The listing may further include a status indicators and other printing system status information for each of the printing systems 108. For example, if the computing device 110-1 is offline, the printing system 108-1 may be unavailable. Other printing system status information may include, for example, a current queue length for documents queued to be printed.

The user may then select a printing system 108 at the client device 112-2, which generates a network identifier request. Responsive to the network identifier request, the server 104 may retrieve and provide the stored print system network identifier of the selected printing systems 108 and present it on the web page.

In other examples, rather than retrieving and providing the stored print system network identifier of the selected printing systems 108, responsive to each network identifier request, the server 104 may generate a new print system network identifier mapped to the printing system for each subsequent network identifier request. Thus, for example, new print system network identifier for the printing system 108-1 may include "print.com/printer108-1/req2", "print.com/printer108-1/req3" and so on. The new print system network identifiers similarly identify the corresponding printing system 108 and are configured for identifying print parameters for print jobs. The new print system network identifiers are further configured to bypass authentication at the server 104. Thus, the server 104 may map many print system identifiers to each printing system 108.

Other criteria for generating new print system network identifiers are also contemplated. For example, the server 104 may generate new print system network identifiers based on distinct user identifiers, internet protocol (IP) addresses, or other suitable criteria. For example, users may log in or otherwise be authenticated in the system 100, and hence the server 104 may assign a unique print system network identifier to each user identifier. In further examples, rather than retrieving and providing the stored print system network identifier for the selected printing system 108, the web page listing the printing systems 108 may also directly present the print system network identifiers corresponding to the listed printing systems 108.

At block 310, the server 104 receives a print request, for example from the client device 112. Specifically, the print request is generated based on the print system network identifier and includes one or more print parameters for a print job. For example, the print system network identifier may correspond to a web page configured to receive the one or more print parameters for the print job. In particular, submission of the print parameters at the web page may act as the print request to the server 104. In other examples, the print request may correspond to a print job network identifier which includes the one or more print parameters appended to the print system network identifier.

Figure 4A:
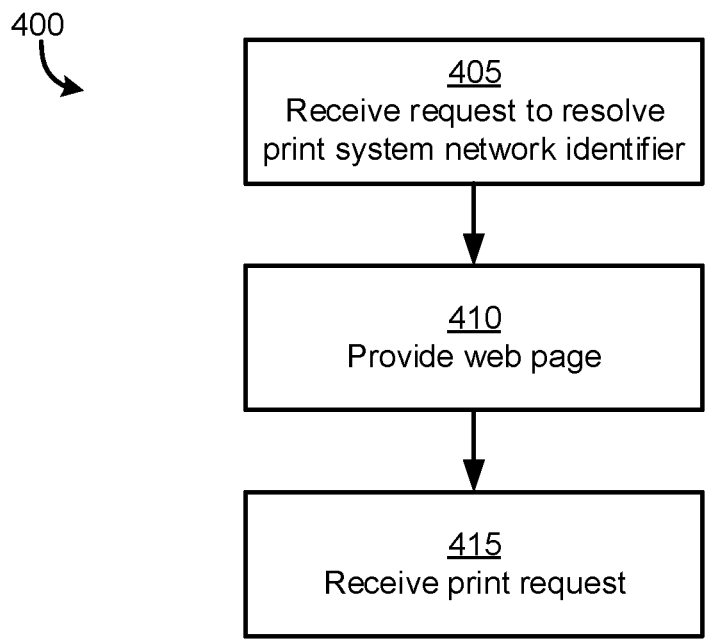
FIG. 4A is a flowchart of an example implementation of block 310 of the method of FIG. 3.
Figure 4B:
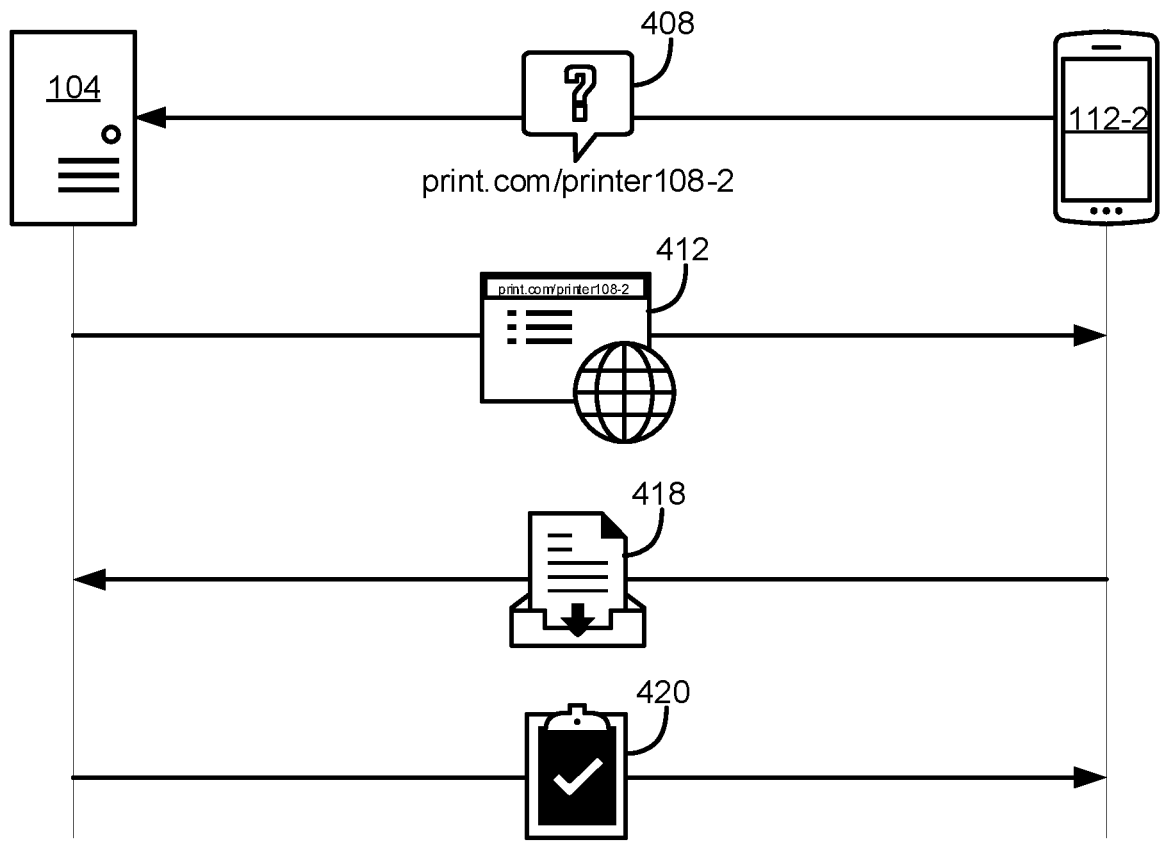
FIG. 4B is a schematic diagram of the flow of data during the method of FIG. 4A.

For example, referring to FIGS. 4A and 4B an example method 400 of receiving a print request and a schematic of the method 400 are depicted. In particular, in the example method 400, the print system network identifier corresponds to a web page configured to receive the one or more print parameters for the print job.

At block 405, the server 104 receives a request 408 to resolve the print system network identifier. In particular, a user of the client device 112-2 may use a web browser application to access the network identifier "print.com/printer108-2". Accordingly, the client device 112-2 generates the request 408 to resolve the URL. According to standard communication protocols, the request 408 may be sent to the server 104, which hosts the network identifier "print.com", to be resolved.

At block 410, the server 104 resolves the request 408, and provides, to the client device 112-2, a web page 412 corresponding to the network identifier "print.com/printer108-2". The web page 412 is configured to receive print parameters for the print job. For example, the web page 412 may be a form or the like, to allow the user to specify the number of copies of the document and other parameters of the print job. To identify the document to be printed, the web page 412 may accept uploads, or another network identifier (e.g., a URL) indicating the path of the document.

At block 415, the server 104 receives, via a submission request at the web page 412, a print request 418 including the one or more parameters input at the web page 412 for the print job. For example, once the user has input the print parameters at the web page 412, the user may select a "submit" button on the web page 412 to initiate the submission request. Thus, the print request 418 including the one or more parameters is submitted to the server 104. In some examples, after successfully receiving the print request 418, the server 104 may return a status indicator 420 to the client device 112-2. For example, the status indicator 420 may simply indicate the success or failure of transmission of the print request 418 to the server 104. In other examples, the status indicator 420 may be dynamic, and may be updated according to the progress of the print job (e.g., the print job is being transmitted to the printer, the printer is printing, the print job is complete).

Figure 5A:
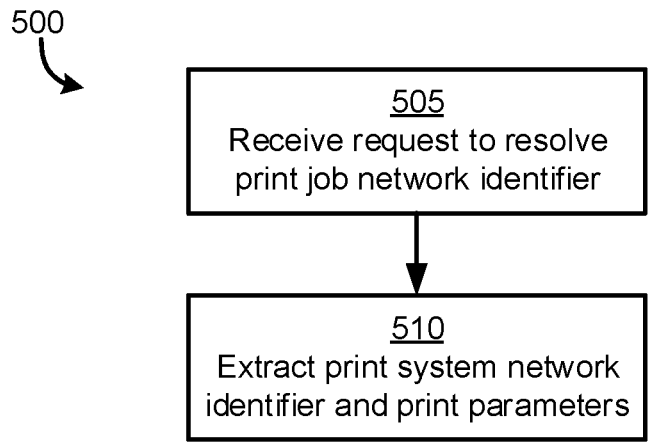
FIG. 5A is a flowchart of another example implementation of block 310 of the method of FIG. 3.
Figure 5B:
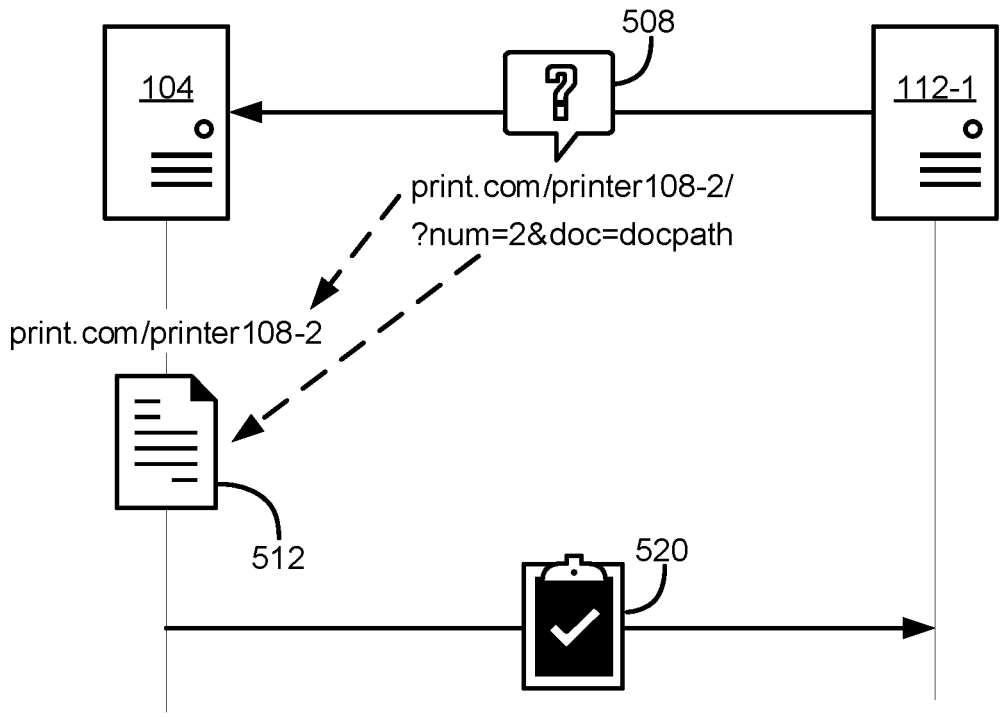
FIG. 5B is a schematic diagram of the flow of data during the method of FIG. 5A.

Turning now to FIGS. 5A and 5B, another example method 500 of receiving a print request and a schematic of the method 500 are depicted. In particular, in the example method 500, the print parameters are to be appended to the print system network identifier to define a print job network identifying forming the print request.

At block 505, the server 104 receives a request 508 to resolve a print job network identifier. In particular, the client device 112-1 may generate the print job network identifier by taking the print system network identifier and appending print parameters as variables to the print system network identifier. The print parameters may specify, for example, the number of copies of the document (e.g., "num=2") and other parameters of the print job. To identify the document to be printed, an embedded network identifier may be included to indicate the path of the document (e.g., "doc=docpath"). The print system network identifier and the parameters may thus be appended to form the print job network identifier "print.com/printer108-2/?num=2&doc=docpath". The client device 112-1 may then generate the request 508 to resolve the URL. According to standard communication protocols, the request 508 may be sent to the server 104, which hosts the network identifier "print.com", to be resolved.

At block 510, the server 104 resolves the request 508 and extracts the print system network identifier and print parameters 512 from the print job network identifier. The request 508 to resolve the print job network identifier thus acts as the print request for a print job having the print parameters 512. In some examples, after successfully resolving the request 508 and extracting the print parameters 512 for the print job, the server 104 may return a status indicator 520 to the client device 112-1. For example, the status indicator 520 may indicate the success or failure of the resolution of the request 508 and the extraction of the print parameters 512. In other examples, the status indicator 520 may be dynamic, and may be updated according to the progress of the print job (e.g., the print job is being transmitted to the printer, the printer is printing, the print job is complete).

In some examples, the server 104 may accommodate both the methods 400 and 500 to receive print requests. For example, users operating the mobile computing device 112-2, or the desktop computer 112-3 may use the method 400 as it provides a more user-friendly interface to input print parameters and generate the print request. Thus, a user desiring to print a document locally saved at the client devices 112-2 or 112-3 may access the web page corresponding to the print system network identifier "print.com/printer108-2", upload the document, and input the print parameters at the web page to generate the print request.

In contrast, the server 112-1 may automatically interface with the server 104, and hence it may be programmatically simpler to append print parameters to the print system network identifier to form a print job network identifier to generate the print request. For example, a user may desire to print a packaging label from "stamps.com", hosted at the server 112-1. Rather than downloading the packaging label from "stamps.com" and uploading the packaging label to the web page corresponding to "print.com/printer108-2", the user may provide to the server 112-1 the print system network identifier "print.com/printer108-2". In some examples, the user may further provide to the server 112-1 print parameters for the print job. The server 112-1 may then translate the print parameters and the network identifier for the packaging label into suitable variables to be appended to the print system network identifier to form the print job network identifier "print.com/printer108-2/?num=2&doc=docpath" for submission to the server 104 to generate the print request.

Returning now to FIG. 3, at block 315, the server 104 generates and sends a print instruction to the appropriate printing system 108. In particular, the server 104 generates the print instruction according to the printing configuration rules stored in the memory 204. The print instruction initiates the print job according to the print parameters received with the print request at block 310. In some examples, during or after the printing system 108 is executing the print job, the server 104 may receive a status indicator from the printing system 108 and may pass the status indication along to the requesting client device 112.

Figure 6:
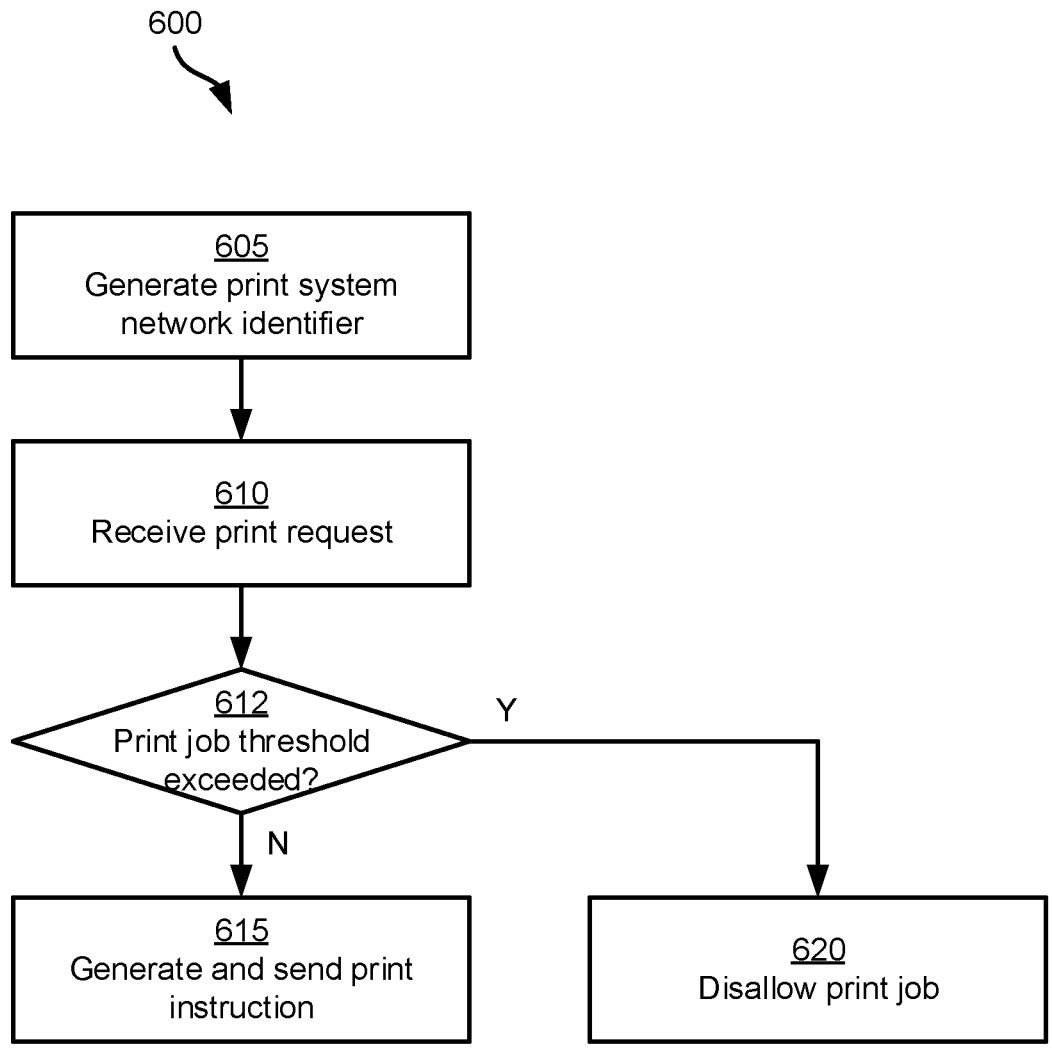
FIG. 6 is a flowchart of another method of cloud-based printing.

In some examples, prior to generating the print instruction, the server 104 may perform one or more checks to ensure that print job thresholds have not been exceeded. For example, referring to FIG. 6, an example method 600 of cloud-based printing including a check of print job thresholds. The method 600 is similar to the method 300, and like blocks are similarly numbered.

In particular, at block 605, the server 104 generates a print system network identifier. At block 610, the server 104 receives a print request from a client device 112, for example, by methods 400 or 500.

Prior to generating the print instruction, at block 612, the server 104 checks whether a print job threshold has been exceeded. For example, the server 104 may maintain, in the memory 204, a count of print jobs requested by an IP address over a predefined time interval (e.g., number of print jobs requested within the past 10 hours, 24 hours, 7 days, or the like). To reduce misuse of the system, the server 104 may compare the count of print jobs requested by the IP address to a threshold number of print jobs for the predefined time interval. When the count exceeds the threshold number of print jobs, the determination at block 612 is affirmative, and the server 104 proceeds to block 620. When the count does not exceed the threshold number of print jobs, the determination at block 615 is negative and the server 104 proceeds to block 615. In other examples, the server 104 may alternately or additionally implement other criteria for managing print jobs.

At block 615, the server 104 generates and sends the print instruction based on the printing configuration rules and the print parameters.

At block 620, the server 104 disallows the print request and any further print jobs from the IP address. The server 104 may return a notification to the client device, for example, indicating that the maximum number of print jobs for the predefined time interval has been reached.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method comprising:
    storing configuration rules for interfacing with a plurality of systems;
    assigning each of the plurality of systems a system network identifier, the system network identifier being different for each of the plurality of systems;
    receiving, from a client device, a request to initiate a job, the request including one or more parameters and the system network identifier assigned to a selected one of the plurality of systems; and
    sending an instruction to the selected one of the plurality of systems in response to the request from the client device to initiate the job at the selected one of the plurality of systems according to the one or more parameters, the instruction generated according to the configuration rules,
    wherein the system network identifier is generated and assigned to the selected one of the plurality of systems in response to the request to initiate the job.

2. The method of claim 1, wherein the system network identifier assigned to the selected one of the plurality of systems corresponds to a web page that provides a user interface for the selected one of the plurality of systems, the web page is configured to receive the one or more parameters for the job.

3. The method of claim 2, wherein receiving the request comprises:
    receiving a request to resolve the system network identifier;
    providing the web page to receive the one or more parameters for the job; and
    receiving, via a submission request at the web page by the client device, the request including the one or more parameters for the job.

4. The method of claim 1, wherein the request corresponds to a job network identifier, the job network identifier including the one or more parameters appended to the system network identifier.

5. The method of claim 4, wherein receiving the request comprises:
    receiving a request to resolve the job network identifier; and
    extracting, from the job network identifier, the system network identifier and the one or more parameters for the job.

6. The method of claim 1, further comprising:
    receiving, from a requesting device, a network identifier request for the system; and
    responsive to the network identifier request, providing, to the requesting device, the system network identifier.

7. The method of claim 6, further comprising:
    receiving a subsequent network identifier request for the system;
    generating a new system network identifier mapped to the system, the new system network identifier configured for identifying parameters for jobs; and
    responsive to the subsequent network identifier request, providing the new system network identifier.

8. The method of claim 1, further comprising:
maintaining a count of jobs requested by an internet protocol address over a predefined time interval; and
when the count exceeds a threshold number of jobs for the predefined time interval, disallowing requests from the internet protocol address.

9. The method of claim 1, wherein the system network identifier is configured to bypass a requirement for authentication by a server that receives the request.

10. The method of claim 1, wherein a new system network identifier is generated and assigned to the selected one of the plurality of systems for a new request.

* * * * *